Dec. 15, 1931.     D. B. REPLOGLE     1,836,336
PIPE JOINT
Original Filed Aug. 2, 1924
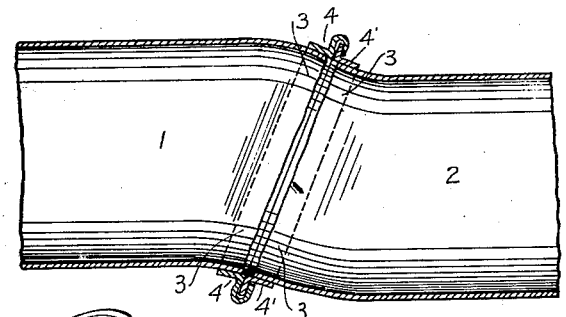
Fig. 1
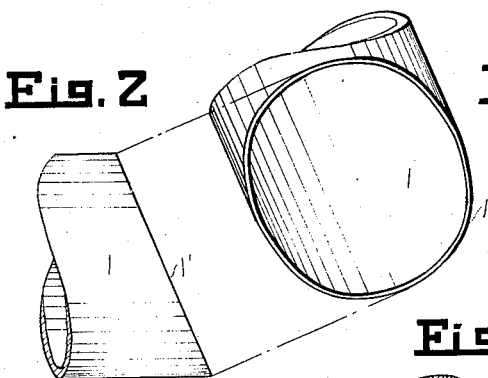
Fig. 2
Fig. 4
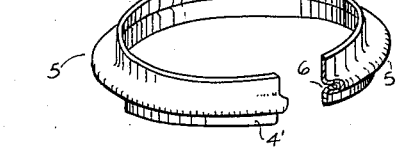
Fig. 3
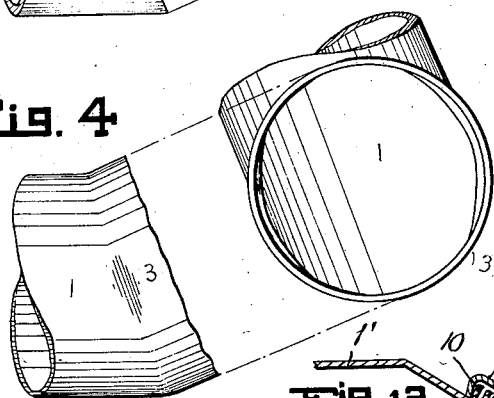
Fig. 5
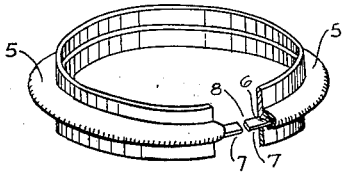
Fig. 6
Fig. 7
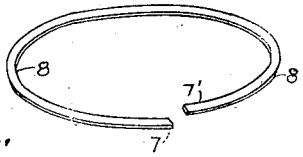
Fig. 8
Fig. 11
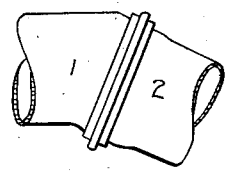
Fig. 12
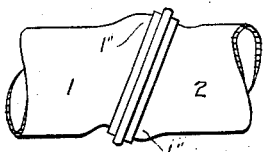
Fig. 9     Fig. 10
INVENTOR
D. B. Replogle Patented Dec. 15, 1931

1,836,336

UNITED STATES PATENT OFFICE

DANIEL BENSON REPLOGLE, OF BERKELEY, CALIFORNIA, ASSIGNOR TO THE COMMERCE GUARDIAN TRUST & SAVINGS BANK, TRUSTEE, OF TOLEDO, OHIO

PIPE JOINT

Application filed August 2, 1924, Serial No. 729,759, and in Great Britain July 27, 1923. Renewed June 26, 1930.

This invention relates to joints in fluid pipes and the method of forming the same. The objects or purposes of the invention are to secure the benefits of flexibility in fluid carrying pipes or conduits constructed of rigid materials such as metals; and to simplify and improve the method of joining sections of such pipes with this purpose in view.

To these ends the invention consists in the construction and arrangement of the parts as herein specified and illustrated in the accompanying drawings, and by the procedures to attain the said construction and arrangement as set forth.

In the drawings, similar characters of reference denote like and corresponding parts in the several figures.

Fig. 1 shows a longitudinal cross-section of two like or similar pieces or sections of thin-walled metallic pipe, joined at their ends according to my invention—the ends joined having first been cut off at an angle of twenty two and a half degrees each, from a perpendicular to the line of the axes.

Figs. 2 and 3 show respectively an edge and a plan view of the elliptical figure produced by cutting transversely through a round pipe—the first step in preparing one of the pipe ends to be joined as shown in Figure 1.

Figs. 4 and 5 show the same part as Figs. 2 and 3, but after the metal edge of the elliptical figured end has been reduced, by swaging, to a cylindrically shaped rim, of a circumference substantially equal to the perimeter of the elliptical end from which it has been formed, and having a diameter that is a mean proportional, substantially, between the major and minor axes of the said elliptical metal end.

Fig. 6 is a view in perspective, with parts broken away, showing the details of construction of an assembled sliding ring adapted for securing together the ends of the pipe sections to be joined according to my invention.

Fig. 7 is a substitute or alternative form of the ring shown in Fig. 6, wherein an annular padding is interposed between the sliding surfaces of the two principal members of the ring.

Fig. 8 is a perspective of a flattened wire suitable for padding between the flat sliding surfaces of ring members before referred to.

Fig. 9 is a reduced size view of pipe ends joined as shown in Fig. 1, but where the sections have been turned 180 degrees with respect to one another, from the position or relation shown in the first figure.

Fig. 10 is a view similar to Fig. 9, except that the sections have been turned only half as far.

Fig. 11 represents sections of pipe joined according to my invention, wherein the axes of the several joined portions are brought to coincidence, by a special forming of the circular rims before securing together by the sliding ring joint, and when the sections are turned to the parallel position with respect to each other.

Fig. 12 is a sectional view of a modified joint wherein flanges are formed integral with the pipe ends, and a separate ring is employed for sealing the flanges in rotary sliding contact.

Referring more particularly to the drawings, it is to be understood that the parts or sections 1 and 2 to be joined are here shown as being alike and straight though they may be of greatly varying forms in practice. The essential feature for getting the results aimed at is that the ends to be joined be brought to conform to a circle lying in a plane cutting the axis of at least one of the parts or sections at an other than right angle, and that said parts be of swageable material. The sloping edge 1' is then reduced to a cylindrical rim 3 designed to fit either into or over the corresponding rim 4 or 4' of the sliding joint ring, where it is to be permanently secured by welding or otherwise.

The ring members are preferably stamped out from discs, the member having the encompassing flange 5 being made from a larger size disc than the member having the encompassed flange 6. The encompassing flange 5 may be made large enough to include one or more paddings 8 in addition to the annular flange 6 within its fold, but it is not to be closed tightly down on the encompassed parts. They are to fit against unnecessary leaking, but to permit of a rotary sliding movement, each upon each, whereby the parts or sections to be joined may readily be brought into varying angular relations with each other by twisting or turning, with reference to each other. To secure against too much looseness or rattling of the swivel joint thus made, the padding rings 8 to be used may have the ends 7 and 7' thereof staggered so as to have a slight springing yield, yet firmly holding the annular faces of the encompassing and encompassed flanges against leakage. A particular feature of the improved joint thus produced, is that the fluid pressure within the pipe or without the pipe having the same, tends to press the flanges of the joint into greater sealing contact rather than separate them and cause leaking.

Where it is desired to align the several sections of a conduit or pipe having this form of swivel or sliding joint, a bend 1'' as shown in Fig. 11 off-setting the flanged rim 5 is required.

It is apparent, of course that except for the difficulties of construction the encompassing and encompassed flanges of the sliding ring element, might be integrally constructed by overturning and swaging the cut off exposed edges of the body of the conduit or pipe sections as shown in Fig. 12. It is not intended here to exclude such construction from the scope of the invention; but to give one of the alternate equivalent constructions that simplifies getting the result attained. Also, each section of pipe may be provided with a simple out-turning flange as likewise shown in Fig. 12, and the two flanges then brought face to face and encompassed by an U-sectioned encompassing ring constructed independently of each and this latter arrangement is applicable, of course also, where the sliding joint ring elements are first made independent of the pipe sections to be joined.

Swaging to cylindrical rim form, of the elliptical ends of the diagonally cut off pipes, is accomplished by forcing them in a heated or semi-soft condition, into a suitable form or die.

In Fig. 12 the reference numerals 1' and 2' denote fragmentary portions of the pipes to be joined, and these pipes are provided with abutting upstanding annular flanges 10—10, which are held in sealed relation by the encompassing ring 5'.

Having now particularly described and ascertained the nature of my said invention and in what manner the same is to be performed, I declare that what I claim is:—

1. The method of making a fluid tight pipe joint where pipe sections to be joined are cut diagonally, which consists in reducing the elliptically outlined edges of the cut ends to cylindrical rims by swaging and then attaching the same to plain sliding ring elements capable of rotary motion as to each other, and connecting the cut ends together and sealing the joint between the cut ends.

2. The method of making rotatably slidable fluid tight pipe joints which consists in first cutting off diagonally, then in reducing, the elliptical edges of the cut off pipe ends to cylindrical rims by swaging, while in a soft condition said rims having a diameter which is substantially a mean proportional between the major and the minor axes of said elliptical pipe ends, and thereafter securing to the said cylindrical rims, rotatably slidable circular fluid-tight ring elements having similar cylindrical rims adapted to fit over and conform to the first named rims.

3. The method of making a rotatably slidable fluid-tight pipe joint, which consists in first cutting off diagonally, then in reducing the elliptical cut-off pipe ends to cylindrical form by swaging, then connecting the cut ends together in rotary sliding contact, and sealing the joint between the cut ends to render the joint fluid-tight.

4. A fluid-tight swivel joint for thin-walled fluid-carrying pipes wherein the pipe ends to be joined are diagonally cut and swaged to form cylindrical rims adapted to coincide in a plane diagonal to the axes of the pipes when the ends are connected together, ring elements secured to said rims and freely rotatable relatively to each other, said ring elements having abutting upstanding flanges and one of said ring elements having a portion overlapping the flange on the other of said ring elements, whereby a permanent fluid-tight sliding joint is maintained between the two pipe ends.

5. A fluid-tight, freely rotating swivel joint for rotatably connecting adjacent ends of thin-walled fluid-carrying pipes, wherein the adjacent pipe ends meet in a plane diagonal to the axes of the pipes and the interior boundaries of the adjacent pipe ends are circular; comprising a pair of abutting upstanding annular flanges, in fixed relation to the pipe ends, said flanges being adapted to coincide in said plane and adapted to have a rotary sliding motion with respect to each other while in use, and means for permanently sealing said flanges while allowing free relative rotation at all times, whereby different angular positions of the jointed sections are permitted without reducing the carrying capacity of the pipe.

6. In a swivel joint as set forth in claim 5, wherein the abutting flanges are spaced apart slightly; an annular padding ring included between the sliding surfaces of the abutting flanges.

7. A fluid-tight, freely rotating swivel joint for rotatably connecting adjacent ends of thin-walled fluid-carrying pipes, wherein the adjacent pipe ends meet in a plane diagonal to the axes of the pipes and the interior boundaries of the adjacent pipe ends are circular and of greater diameter than the pipe bodies; comprising a pair of abutting upstanding annular flanges, in fixed relation to the pipe ends, said flanges being adapted to coincide in said plane and adapted to have a rotary sliding motion with respect to each other while in use, and means for permanently sealing said flanges while allowing free relative rotation at all times, whereby different angular positions of the jointed sections are permitted without reducing the carrying capacity of the pipe, said flange sealing means including an encompassing ring constructed independent of each of the flanges.

8. A fluid-tight, freely rotating swivel joint for rotatably connecting adjacent ends of thin-walled fluid-carrying pipes, wherein the adjacent pipe ends meet in a plane diagonal to the axes of the pipes and the interior boundaries of the adjacent pipe ends are circular; comprising a pair of abutting upstanding annular flanges, formed integral with the respective pipe ends, said flanges being adapted to coincide in said plane and adapted to have a rotary sliding motion with respect to each other while in use, and means secured to one of said flanges for permanently sealing said flanges while allowing free relative rotation at all times, whereby different angular positions of the jointed sections are permitted without reducing the carrying capacity of the pipe.

9. A fluid-tight, freely rotating swivel joint for rotatably connecting adjacent ends of thin-walled fluid-carrying pipes, wherein the adjacent pipe ends meet in a plane diagonal to the axes of the pipes and the interior boundaries of the adjacent pipe ends are circular and of greater diameter than the pipe bodies; comprising a pair of abutting upstanding annular flanges, formed integral with the respective pipe ends, said flanges being adapted to coincide in said plane and adapted to have a rotary sliding motion with respect to each other while in use, and means for permanently sealing said flanges while allowing free relative rotation at all times, whereby different angular positions of the jointed sections are permitted without reducing the carrying capacity of the pipe, said flange sealing means including an encompassing ring constructed independent of each of the flanges.

10. A fluid-tight, freely rotating swivel joint for rotatably connecting adjacent ends of thin-walled fluid-carrying pipes, wherein the adjacent pipe ends meet in a plane diagonal to the axes of the pipes and the interior boundaries of the adjacent pipe ends are circular; comprising a pair of abutting upstanding annular flanges, in fixed relation to the pipe ends, said flanges being adapted to coincide in said plane and adapted to have a rotary sliding motion with respect to each other while in use, and means for permanently sealing said flanges while allowing free relative rotation at all times, whereby different angular positions of the jointed sections are permitted without reducing the carrying capacity of the pipe, said sealing means including a portion integral with one of the flanges and bent over and overlapping the other of said flanges.

11. A pipe section having one end terminating in a plane at an oblique angle to the axis of the pipe, a portion at said end being swaged into the form of a cylinder, the axis of which is at right angles to said plane.

12. A pipe section having one end terminating in a plane at an oblique angle to the axis of the pipe, a portion at said end being swaged into the form of a cylinder, the axis of which is at right angles to said plane, and the diameter of the cylindrical portion being at least as great as that of the body of the pipe.

In testimony whereof I affix my signature.

DANIEL BENSON REPLOGLE.